UNITED STATES PATENT OFFICE.

WALTER T. SCHEELE, OF HACKENSACK, NEW JERSEY, ASSIGNOR TO H. MORTIMER SPECHT, OF NEW YORK, N. Y.

CELLULOSE COMPOSITION.

1,379,699.  Specification of Letters Patent.  Patented May 31, 1921.

No Drawing.  Application filed October 23, 1920. Serial No. 419,108.

*To all whom it may concern:*

Be it known that I, Dr. WALTER T. SCHEELE, a citizen of the State of Germany, but having declared my intention to become a citizen of the United States of America, residing at Hackensack, in the county of Bergen and State of New Jersey, have invented certain new and useful Improvements in Cellulose Compositions, of which the following is a specification.

This invention relates to cellulose solutions and has for its object the production of an improved solution which is capable of use in many arts with great advantages over similar solutions heretofore known.

Another object is to produce a new and modified form of cellulose which is capable of being readily brought into solution.

Another object of the present invention is to produce a solution of cellulose from which homogeneous, transparent material may readily be obtained.

A further object of the present invention is to produce a solution of cellulose which is clear and is substantially a true solution, that is, it approaches the standard of solutions of simple chemical compounds.

A further object of the invention is to produce a solution from which cellulose may be precipitated by water, alcohol or other suitable liquid directly, without passing through the intermediate condition of coagulated material requiring dehydration before it acquires the desired characteristics.
A further object is the production of acetic cellulose material which is insoluble in ethyl alcohol.

The processes hitherto known for the production of cellulose in solution have been open to many serious objections which are obviated by the present process.

From the solution of pyroxylin or nitrated cellulose, can be obtained products of great strength but of little pliability.
These products require to be mixed with camphor for the production of celluloid. On account of their explosive and highly inflammable character, when used for artificial silk, they have to be denitrated which occasions considerable loss of strength. A further objection to this process is that a considerable amount of cellulose is lost during denitration.

In the known processes where cellulose, without nitration is brought into solution, the usual course is to subject the cellulose first to treatment with sodium hydroxid solution, and to wash the same till free of alkali, before bringing it into solution in cupric oxid ammonia solution, zinc chlorid solution or ammonium sulfo-cyanid solution. In treatment with carbon bisulfid, the cellulose is allowed to remain alkaline. I have found that these solutions as ordinarily produced are not perfect solutions as particles of cellulose can usually be seen by the use of a microscope. A waste of cellulose also results from these processes owing to the production of soluble modifications of cellulose which remain dissolved in the coagulating bath.

For the production, as practised heretofore, of cellulose esters such as cellulose formate, acetate, butyrate and the like, the cellulose is first brought into the hydrated form by treatment with sodium hydroxid or diluted mineral acids such as sulfuric or hydrochloric acids. These processes contain the objection that the solvent action is slow and can only be effected by the application of heat and the resultant solutions are heterogeneous under the microscope.

In accordance with the present invention the cellulose is treated with a mixed solution of hydrogen peroxid and alkali-metal hydroxid, preferably produced by dissolving an alkali-metal peroxid, for instance the peroxid of sodium in water, and by this treatment the nature of the cellulose is changed so that its properties are altered and many advantages over existing processes are obtained. It has been found that the cellulose after treatment with the peroxid solution is readily soluble in a solvent which will not dissolve or dissolves only slowly and with great difficulty, cellulose treated in the ordinary manner and with this solution the objects hereinbefore set forth are obtained.

The cellulose after such treatment is readily acetylated by any ordinary acetylating solvent. For instance, mixed acetic acid and acetic anhydrid dissolve it much more rapidly than ordinary cellulose which has not been subjected to the peroxid treatment. The acetylation is greatly accelerated by catalysts and I have discovered that aluminum chlorid is a highly efficient catalyst.

It is preferred to dry the cellulose before acetylation, as the presence of water causes excessive consumption of acetic anhydrid.

For the purposes of illustration, and without limitation thereto the following example is given.

100 grams of cotton were added to a 10% solution of sodium peroxid in water. The cellulose was entirely covered and the temperature maintained less than 40° C. The cellulose was immersed for 1 hour and the liquid was drained off by suction and the cellulose washed until no more alkaline reaction remained. The cellulose was dried in air and placed in a closed vessel containing five parts of aluminium chlorid, ten parts of acetic anhydrid, and ten parts of glacial acetic acid. Excellent results can also be obtained when the solvent contains 4-6 parts of aluminium chlorid, 7½-12 parts of acetic anhydrid and 7½-12 parts of glacial acetic acid.

The result is a clear solution of high viscosity which can be used for a great many applications in the arts, and may suitably be diluted for any particular purpose, by the addition of such agents, as chloroform, nitrobenzene, ethyl-methyl ketone, or even by water to 75 parts or even more. It has many characteristics which distinguish it from cellulose solutions previously known. It is substantially a perfect solution and the cellulose particles are not visible under the microscope. When treated with excess of water, alcohol or other suitable liquid, the cellulose is precipitated directly without passing through the intermediate condition of coagulated material requiring dehydration before it acquires the desired characteristics. If the solvent is allowed to evaporate from thin layers of the solution, transparent material remains of great strength and pliable nature. This material is a combustible of slow burning nature.

This viscous solution can also be applied to the manufacture of high grade artificial silk by forcing it through fine orifices into water, alcohol or other suitable liquid. The resultant artificial silk fibers, when dry are transparent, of great strength and superior luster and can take almost any dyes without further treatment.

By treatment with peroxid solution a new product is produced. The cellulose so treated when washed with water until free of alkali, and dried in air dissolves almost immediately in the solvent hereinbefore referred to. The solution of cellulose "mercerized" or prepared in the ordinary manner in acetic anhydrid glacial acetic acid and a catalyst is a protracted operation taking about 36 hours.

It must be understood that while I have described by way of example, exact proportions for the solvent, that the invention is not limited to the solvent or to these proportions.

The cellulose which can be recovered from the acetic solution by evaporation or precipitation without decomposition is found to be insoluble in ethyl alcohol and to be readily soluble in ethyl methyl ketone. The solution in the latter solvent may be used for many technical purposes, as the product therefrom has elastic characteristics. These properties should be compared with those of cellulose acetate as ordinarily produced. The acetate is insoluble in ethyl-methyl ketone, and dissolves readily in alcohol, but the solid products obtained from the alcoholic solution are of brittle character.

While I do not restrict my invention to any particular theory, I nevertheless am of the opinion that the treatment with the peroxid, results in a modified cellulose, probably of ketone or aldehyde condition which is capable of being acetylated beyond the triacetate condition which has hitherto been considered the limit. This treatment probably converts the carbonyl group into condition for acetylation.

What I claim is:

1. The process of making acetic cellulose solution, which comprises treating cellulose with a mixed solution of hydrogen peroxid and alkali-metal hydroxid, washing free of alkali and acetylating.

2. The process of making acetic cellulose solution, which comprises treating cellulose with a mixed solution of hydrogen peroxid and sodium hydroxid, washing free of alkali and acetylating.

3. The process of making acetic cellulose solution which comprises treating cellulose with an aqueous solution of peroxid of an alkali-metal, washing free of alkali, drying at ordinary temperatures and acetylating.

4. The process of making acetic cellulose solution which comprises treating cellulose with an aqueous solution of peroxid of sodium, washing free of alkali, drying at ordinary temperatures and acetylating.

5. The process of making acetic cellulose solution, which comprises treating cellulose with a mixed solution of hydrogen peroxid and alkali-metal hydroxid, washing free of alkali and dissolving in a solution containing glacial acetic acid and acetic anhydrid.

6. The process of making acetic cellulose solution, which comprises treating cellulose with a mixed solution of hydrogen peroxid and sodium hydroxid, washing free of alkali and dissolving in a solution containing glacial acetic acid and acetic anyhydrid.

7. The process of making acetic cellulose solution which comprises treating cellulose with an aqueous solution of peroxid of an alkali metal, washing free of alkali, drying at ordinary temperatures and dissolving in a solution containing glacial acetic acid and acetic anhydrid.

8. The process of making acetic cellulose solution which comprises treating cellulose with an aqueous solution of peroxid of sodium, washing free of alkali, drying at ordinary temperatures and dissolving in a solution containing glacial acetic acid and acetic anhydrid.

9. The process of making acetic cellulose solution, which comprises treating cellulose with a mixed solution of hydrogen peroxid and alkali-metal hydroxid, washing free of alkali and dissolving in a solution containing glacial acetic acid, acetic anhydrid and a catalyst.

10. The process of making acetic cellulose solution, which comprises treating cellulose with a mixed solution of hydrogen peroxid and sodium hydroxid, washing free of alkali and dissolving in a solution containing glacial acetic acid, acetic anhydrid and a catalyst.

11. The process of making acetic cellulose solution which comprises treating cellulose with an aqueous solution of peroxid of an alkali metal, washing free of alkali, drying at ordinary temperatures and dissolving in a a solution containing glacial acetic acid, acetic anhydrid and a catalyst.

12. The process of making acetic cellulose solution which comprises treating cellulose with an aqueous solution of peroxid of sodium, washing free of alkali, drying at ordinary temperatures and dissolving in a solution containing glacial acetic acid, acetic anhydrid and a catalyst.

13. The process of making acetic cellulose solution, which comprises treating cellulose with a mixed solution of hydrogen peroxid and alkali-metal hydroxid, washing free of alkali, and dissolving in a solution containing glacial acetic acid, acetic anhydrid and aluminum chlorid.

14. The process of making acetic cellulose solution, which comprises treating cellulose with a mixed solution of hydrogen peroxid and sodium hydroxid, washing free of alkali and dissolving in a solution containing glacial acetic acid, acetic anhydrid and aluminum chlorid.

15. The process of making acetic cellulose solution which comprises treating cellulose with an aqueous solution of peroxid of an alkali-metal, washing free of alkali, drying at ordinary temperatures and dissolving in a solution containing glacial acetic acid, acetic anhydrid and aluminum chlorid.

16. The process of making acetic cellulose solution which comprises treating cellulose with an aqueous solution of peroxid of sodium, washing free of alkali, drying at ordinary temperatures and dissolving in a solution containing glacial acetic acid, acetic anhydrid and aluminum chlorid.

17. The process of making acetic cellulose solution, which comprises treating cellulose with a mixed solution of hydrogen peroxid and alkali-metal hydroxid, washing free of alkali, acetylating, precipitating the acetic cellulose by the addition of non-solvent to the solution, recovering the precipitated acetic cellulose and dissolving the same in ethyl-methyl ketone.

18. The process of making acetic cellulose solution, which comprises treating cellulose with a mixed solution of hydrogen peroxid and sodium hydroxid, washing free of alkali, acetylating, precipitating the acetic cellulose by the addition of non-solvent to the solution, recovering the precipitated acetic cellulose and dissolving the same in ethyl-methyl ketone.

19. The process of making acetic cellulose solution which comprises treating cellulose with an aqueous solution of peroxid of sodium, washing free of alkali, drying at ordinary temperatures, acetylating, precipitating the acetic cellulose by the addition of non-solvent to the solution, recovering the precipitated acetic cellulose and dissolving the same in ethyl-methyl ketone.

20. The process of making acetic cellulose solution which comprises treating cellulose with a mixed solution of hydrogen peroxid and sodium hydroxid, washing free of alkali, dissolving in a solution containing glacial acetic acid and acetic anhydrid, precipitating the acetic cellulose by the addition of non-solvent to the solution, recovering the precipitated acetic cellulose and dissolving the same in ethyl-methyl ketone.

21. The process of making acetic cellulose solution which comprises treating cellulose with an aqueous solution of peroxid of an alkali-metal, washing free of alkali, drying at ordinary temperatures, dissolving in a solution containing glacial acetic acid and acetic anhydrid, precipitating the acetic cellulose by the addition of non-solvent to the solution, recovering the precipitated acetic cellulose and dissolving the same in ethyl-methyl ketone.

22. A cellulose composition comprising cellulose treated with a solution of alkali-metal peroxid and washed free of alkali.

23. A cellulose composition comprising cellulose treated with a solution containing hydrogen peroxid and sodium hydroxid, washed free of alkali and dried at ordinary temperature.

24. A cellulose composition comprising cellulose treated with a solution of alkali-metal peroxid, washed free of alkali and acetylated.

25. A cellulose composition, comprising cellulose treated with a solution, containing hydrogen peroxid and sodium hydroxid, washed free of alkali, dried at ordinary temperatures and acetylated.

In testimony whereof I affix my signature.

WALTER T. SCHEELE.